(12) United States Patent
Gao et al.

(10) Patent No.: US 11,829,604 B2
(45) Date of Patent: Nov. 28, 2023

(54) METHOD, DEVICE AND COMPUTER PROGRAM PRODUCTS FOR STORAGE MANAGEMENT

(71) Applicant: EMC IP Holding Company LLC, Hopkinton, MA (US)

(72) Inventors: Hongpo Gao, Beijing (CN); Xinlei Xu, Beijing (CN); Lifeng Yang, Beijing (CN); Jianbin Kang, Beijing (CN); Geng Han, Beijing (CN); Zhenhua Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/020,033

(22) Filed: Sep. 14, 2020

(65) Prior Publication Data

US 2021/0286526 A1    Sep. 16, 2021

(30) Foreign Application Priority Data

Mar. 12, 2020   (CN) .......................... 202010172700.4

(51) Int. Cl.
*G06F 3/06*       (2006.01)
*G06F 1/10*       (2006.01)
*G06F 11/10*      (2006.01)

(52) U.S. Cl.
CPC .......... *G06F 3/0619* (2013.01); *G06F 3/0622* (2013.01); *G06F 3/0653* (2013.01); *G06F 3/0659* (2013.01); *G06F 3/0683* (2013.01); *G06F 11/1092* (2013.01)

(58) Field of Classification Search
None
See application file for complete search history.

(56) References Cited

U.S. PATENT DOCUMENTS

| | | |
|---|---|---|
| 9,703,498 B1 | 7/2017 | Armangau et al. |
| 9,804,939 B1 * | 10/2017 | Bono ..................... G06F 3/0689 |
| 10,318,169 B2 | 6/2019 | Dalmatov et al. |
| 10,365,827 B1 * | 7/2019 | Satish ................. G06F 12/1072 |
| 10,365,983 B1 | 7/2019 | Foley et al. |
| 10,789,017 B1 | 9/2020 | Bono et al. |
| 10,922,177 B2 | 2/2021 | Gong et al. |
| 10,983,964 B1 | 4/2021 | Bono et al. |
| 11,023,147 B2 | 6/2021 | Shang et al. |
| 11,048,416 B2 | 6/2021 | Liu et al. |
| 2006/0161805 A1 * | 7/2006 | Tseng .................. G06F 11/1092 |
| | | 714/6.22 |

(Continued)

*Primary Examiner* — Sanjiv Shah
*Assistant Examiner* — Alexander J Yoon
(74) *Attorney, Agent, or Firm* — BainwoodHuang

(57) ABSTRACT

Techniques for storage management involve determining, in response to a detection that a disk changes from an unavailable state to an available state, at least one candidate storage unit associated with the disk; acquiring historical access information about the at least one candidate storage unit, the historical information comprising information related to a write request directed to the at least one candidate storage unit when the disk is in the unavailable state; determining a target storage unit from the at least one candidate storage unit based on the historical access information; and rebuilding the target storage unit. Such techniques may, in a low-cost manner, improve rebuilding efficiency and reliability of a storage system.

10 Claims, 6 Drawing Sheets

(56) References Cited

U.S. PATENT DOCUMENTS

| | | | |
|---|---|---|---|
| 2009/0063486 A1* | 3/2009 | Oza | G06F 11/2082 |
| 2012/0089778 A1* | 4/2012 | Au | G06F 3/0604 |
| | | | 711/114 |
| 2012/0166576 A1* | 6/2012 | Orsini | G06F 9/3863 |
| | | | 709/217 |
| 2014/0351674 A1* | 11/2014 | Grube | H04L 67/1097 |
| | | | 714/764 |

* cited by examiner

METHOD, DEVICE AND COMPUTER PROGRAM PRODUCTS FOR STORAGE MANAGEMENT

CROSS-REFERENCE TO RELATED APPLICATION

This application claims priority to Chinese Patent Application No. CN202010172700.4, on file at the China National Intellectual Property Administration (CNIPA), having a filing date of Mar. 12, 2020, and having "METHOD, DEVICE AND COMPUTER PROGRAM PRODUCTS FOR STORAGE MANAGEMENT" as a title, the contents and teachings of which are herein incorporated by reference in their entirety.

TECHNICAL FIELD

Embodiments of this disclosure generally relate to the field of data storage, and in particular, to a method, an electronic device, and a computer program product for storage management.

BACKGROUND

It has been noted that disk failures in a storage system are sometimes not permanent, but temporary. For example, a disk may be initially in an online state, but then is temporarily in an offline state and afterwards is returned to normal. In addition, a disk may be determined by the system as in an online state later than other disks during startup of the system, or the disk may be temporarily in an offline state during firmware upgrade of the disk.

In general, once a disk failure occurs, the system will rebuild storage units (Uber) built with the storage space of the disk. The storage units may generally be divided into different layers. Storage units at a user data layer are configured to store user data, and storage units at a metadata layer are configured to store metadata. Rebuilding performance at the user data layer is more critical than that at the metadata layer because most of the storage space is consumed by the user data layer.

Rebuilding of the user data layer at a Physical Large Block (PLB) level has been supported. However, for each PLB, scanning is required to detect whether the PLB needs to be rebuilt. This process causes the rebuilding process to proceed slowly and may result in data loss during the rebuilding. Meanwhile, the rebuilding overhead is significantly increased, and system performance is affected.

SUMMARY OF THE INVENTION

A method, an electronic device, and a computer program product for storage management are provided in the embodiments of this disclosure.

In a first aspect of the embodiments of this disclosure, a method for storage management is provided. The method includes determining, in response to a detection that a disk changes from an unavailable state to an available state, at least one candidate storage unit associated with the disk; acquiring historical access information about the at least one candidate storage unit, the historical information including information related to a write request directed to the at least one candidate storage unit when the disk is in the unavailable state; determining a target storage unit from the at least one candidate storage unit based on the historical access information; and rebuilding the target storage unit.

In a second aspect of the embodiments of this disclosure, an electronic device is provided. The device includes a processor; and a memory coupled to the processor and storing instructions to be executed, wherein when executed by the processor, the instructions cause the electronic device to perform actions including: determining, in response to a detection that a disk changes from an unavailable state to an available state, at least one candidate storage unit associated with the disk; acquiring historical access information about the at least one candidate storage unit, the historical information including information related to a write request directed to the at least one candidate storage unit when the disk is in the unavailable state; determining a target storage unit from the at least one candidate storage unit based on the historical access information; and rebuilding the target storage unit.

In a third aspect of this disclosure, a computer program product is provided. The computer program product is tangibly stored in a non-transitory computer-readable medium and includes machine-executable instructions. When executed, the machine-executable instructions cause a machine to perform steps of the method according to the first aspect described above.

The summary is provided to introduce the choice of concepts in a simplified form, which will be further described in the detailed description below. The summary is neither intended to identify key features or major features of this disclosure, nor intended to limit the scope of this disclosure.

BRIEF DESCRIPTION OF THE DRAWINGS

Identical or corresponding numerals represent identical or corresponding parts in various drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Various example embodiments of this disclosure will be described in detail below with reference to the accompanying drawings. It should be noted that only example embodiments are involved in the accompanying drawings and description. It should be indicated that according to the subsequent description, it is easy to conceive of alternative embodiments of the structures and methods disclosed here, and such alternative embodiments can be used without departing from the principles and examples provided by this disclosure.

It should be understood that the example embodiments are given only to enable those skilled in the art to better understand and then implement this disclosure and are not intended to limit the scope of this disclosure in any way.

The term "include," "comprise," and similar variants used here should be understood as open inclusion, i.e., "including/comprising, but not limited to." The term "based on" indicates "based at least in part on." The term "some embodiments" indicates "at least some embodiments." The term "another embodiment" indicates "at least one additional embodiment." Related definitions of other terms will be given in the following description.

Figure 1:
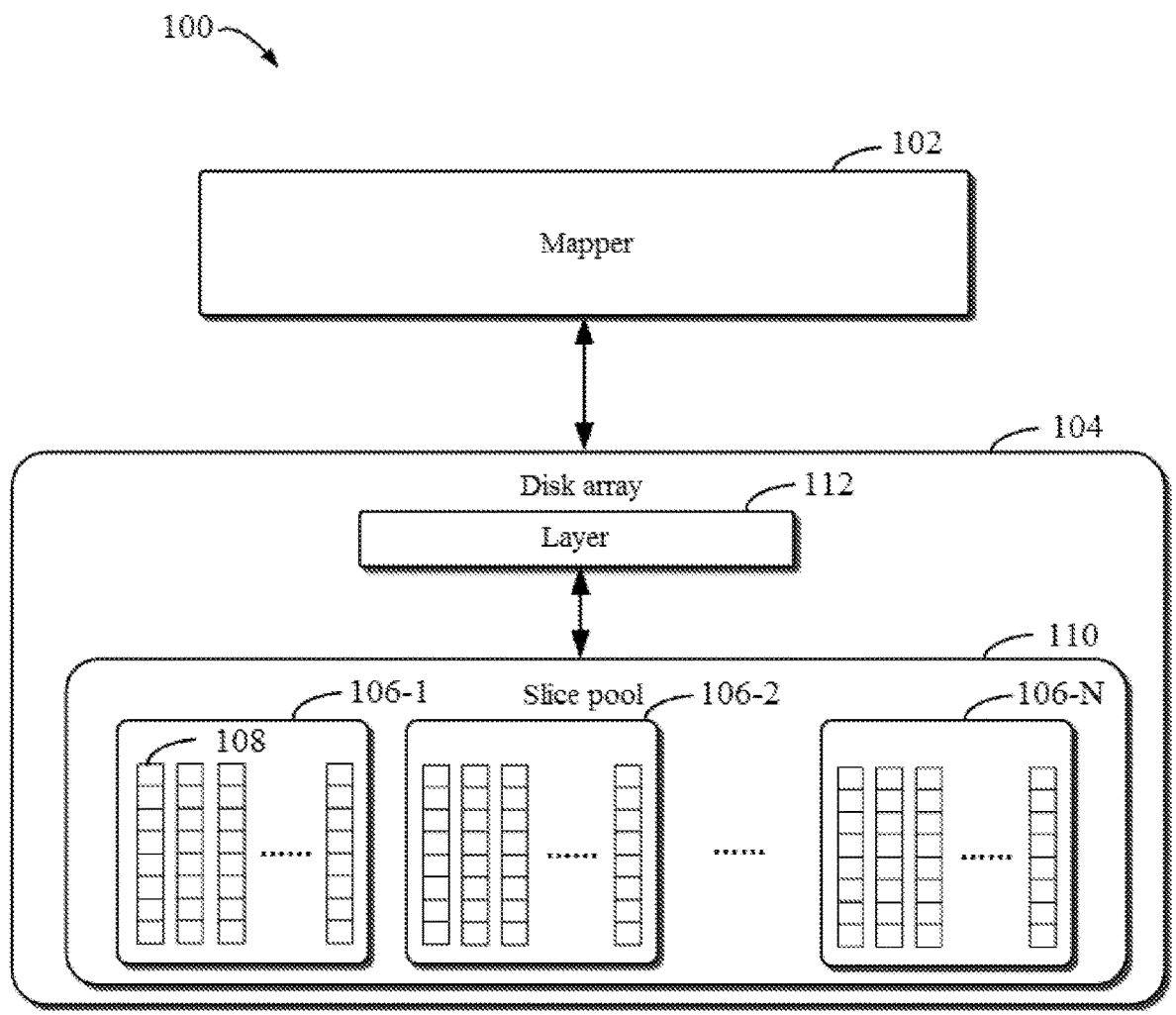
FIG. 1 is a schematic diagram of an example operating environment in which embodiments of this disclosure can be implemented.

FIG. 1 is a schematic diagram of an example system according to this disclosure. As shown in FIG. 1, system 100 includes mapper 102. Mapper 102 is configured to map an address in a user request to a physical space for storing data to facilitate data reading or writing by a user.

Mapper 102 can provide a logical storage space with a predetermined size for an upper layer application. In some examples, the size of the logical storage space may be 8 EB. The above example is only used to illustrate the size of the logical storage space that can be provided, but not to limit this disclosure. A logical storage space of any size can be set as needed.

In mapper 102, a mapping between logical addresses and physical addresses can be maintained using any appropriate structure. In an example, the mapping between logical addresses and physical addresses is maintained with a B+ tree. The mapping includes a mapping from a virtual logical block to a physical block. The virtual logic block includes one or more nodes. The above example is for illustrative purposes only, but not a limitation to this disclosure. The mapping relationship between logical addresses and physical addresses in mapper 102 may be set as any appropriate structure as needed.

In an example, addresses of physical blocks are stored in the node. In an example, the minimum granularity of the mapping is a page of 4 KB. The above example is for illustrative purposes only, but not a limitation to this disclosure. Based on needs, any appropriate information associated with the physical blocks can be stored and mapping granularity of any size can be set.

In an example, if mapper 102 receives a write request, mapper 102 first aggregates enough 4-KB pages to a 2-MB Physical Large Block (PLB), and then executes the write request in units of PLBs. In the case that mapper 102 receives a read request, mapper 102 may execute the read request in units of physical addresses less than or equal to 2 MB.

Storage system 100 further includes physical disk array 104. In an example, the physical disk array may be a redundant array of independent disks (RAID). In another example, the physical disk array may be a physical disk array of any suitable type. The physical disk array has a predetermined width. The width of the physical disk array is the number of physical disks that make up strips in the physical disk array. In an example, a RAIDS with a physical disk array width of 4+1 indicates that the number of physical disks that make up strips of the RAIDS is 4+1, i.e., 4 physical disks for storing data and 1 physical disk for storing check data.

Physical disk array 104 includes slice pool 110. Slice pool 110 includes one or more physical disks 108. Each physical disk 108 is divided into one or more fixed-size physical disk slices. FIG. 1 shows that a physical disk 108 includes eight physical disk slices. The above example is intended only to illustrate this disclosure, but not to limit this disclosure. In other embodiments, each physical disk may be set to include any number of physical disk slices as needed.

The size of the physical disk slices may be set to any value as needed. In an example, the size of the physical disk slices is 4 GB. The above example is intended only to illustrate this disclosure, but not to limit this disclosure. In other embodiments, physical disk slices of any size can be set as needed.

The physical disks in slice pool 110 are integrated into one or more RAID Resilience Sets (RRS) 106-1, 106-2 . . . , and 106-N (which can be collectively referred to as RAID resilience set 106 herein), where N is a positive integer greater than 1. In consideration of the reliability of the RAID, the number of physical disks included in one RRS needs to be limited. Therefore, the number N of RAID resilience sets 106 depends on the number of physical disks. In general, the number of physical disks contained in each RRS is limited to 25. If the number of physical disks is greater than 25, a new RRS needs to be created.

Slices of RAID resilience set 106 can be configured to form one or more logical storage units. In an example, slices of one logical storage unit are from the same RAID resilience set. A logical storage unit is equivalent to a conventional RAID. In an example, a mapping relationship between logical storage units and PLBs are stored in mapper 102. The above example is intended only to illustrate this disclosure, but not to limit this disclosure.

Physical disk array 104 also includes one or more layers. A physical disk array including layer 112 is shown in FIG. 1 for illustrative purposes only. The above example is intended only to illustrate this disclosure, but not to limit this disclosure. Any suitable number of layers can be set as needed.

Layer 112 is read and/or called by mapper 102. Layer 112 includes one or more logical storage units. The logical storage units can be considered as a RAID stripe set associated with a plurality of physical disk slices. Alternatively or additionally, the logical storage units in layer 112 have the same physical disk array format. In an example, different layers may have different physical disk array formats. In another example, different layers may have the same physical disk array format.

In some examples, the logical storage units in layer 112 may be of an appropriate physical disk array type and/or physical disk array width. For example, the logical storage units adopt RAID 5 with a physical disk array width of 4+1, RAID 5 with a physical disk array width of 8+1, or RAID 5 with a physical disk array width of 16+1. The above example is for illustrative purposes only, but not a limitation to this disclosure. The logical storage units in the layer may adopt any appropriate physical disk array type and physical disk array width as needed.

As described above, once physical disk 108 in slice pool 110 fails, the system will rebuild storage units in layer 112 built by using the storage space of physical disk 108, that is, the storage space of disk slices of physical disk 108. However, physical disk 108 may not permanently fail, but only temporarily be in an offline state. Physical disk 108, for example, may switch back to an online state in five minutes. In this case, conventional rebuilding requires a large system overhead, because it needs to rebuild each storage unit associated with the physical disk failed previously. This will have a negative impact on system performance. In addition, data loss may also occur.

Therefore, a solution for storage management is proposed in an embodiment of this disclosure. According to the solution, only necessary storage units are rebuilt when a physical disk is recovered from a transient failed (offline) state. As such, the system overhead can be significantly reduced, and data loss can be avoided.

Figure 2:
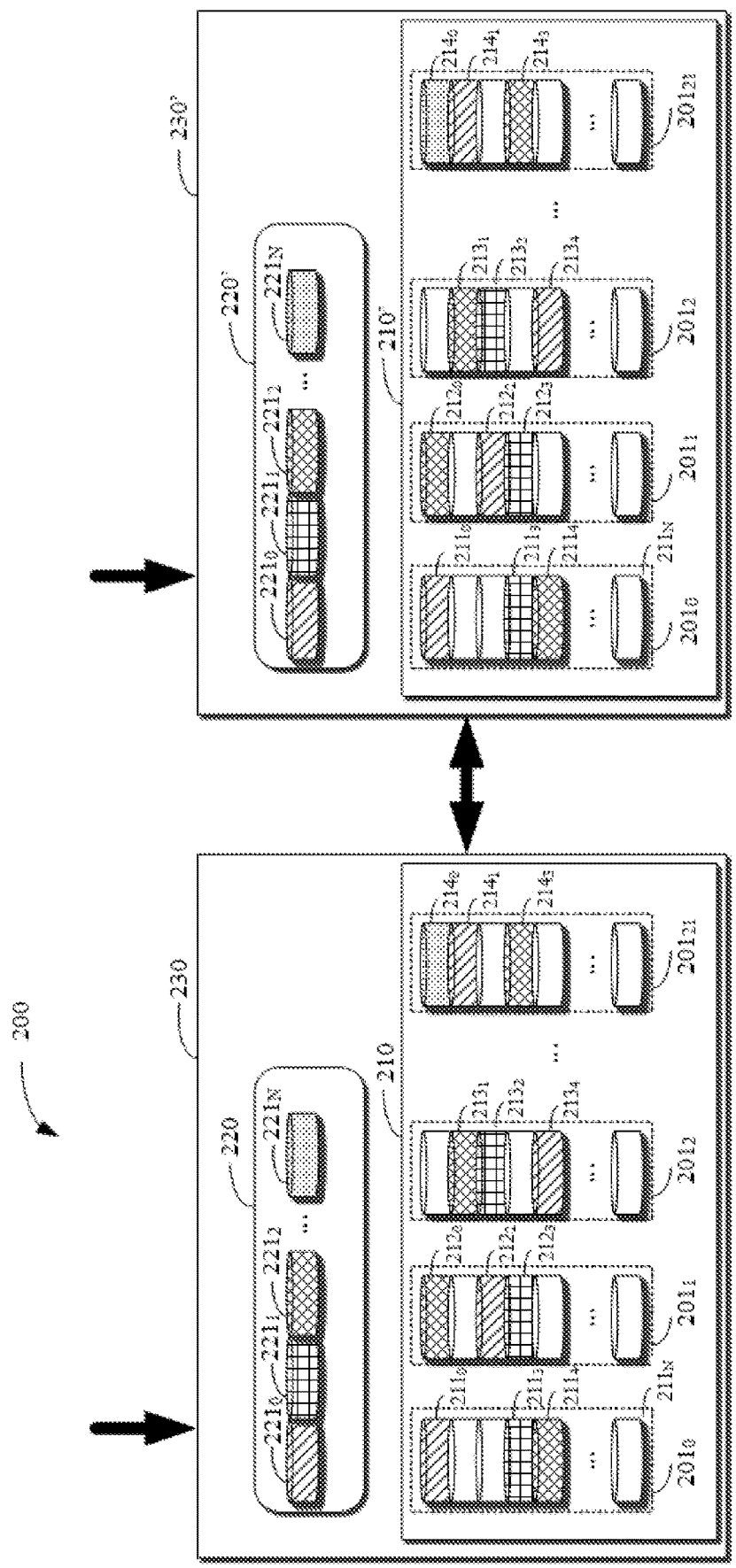
FIG. 2 is a schematic diagram of an example of a storage system according to an embodiment of this disclosure.

The solution for storage management according to an embodiment of this disclosure is described below in detail with reference to FIG. 2 to FIG. 4. FIG. 2 is a schematic diagram of an example of a storage system according to an embodiment of this disclosure.

As shown in FIG. 2, storage system 200 may include physical disk array 230 which includes slice pool 210. Slice pool 210 includes disks $201_0$-$201_{21}$. Each disk in disks $201_0$-$201_{21}$ is divided into a plurality of fixed-size disk slices. For example, disk $201_0$ can be divided into a plurality of disk slices $211_0$-$211_N$.

One or more disk slices in disks $201_0$-$201_{21}$ can be allocated to build storage units $221_0$-$221_N$. For example, the storage space of disk slices $211_0$, $212_2$, $213_4$, and $214_1$ is allocated to storage unit $221_0$. For another example, the storage space of disk slices $211_3$, $212_3$, and $213_2$ is allocated to storage unit $221_0$. A list of the storage units that have been built is kept in layer 220.

As shown in FIG. 2, storage system 200 may also include physical disk array 230'. Two storage system nodes with the same architecture may exist in the storage system. For example, physical disk array 230 may be considered as a storage system node, and physical disk array 230' may be considered as another storage system node that is a peer of physical disk array 230. It can be seen from FIG. 2 that the architecture of physical disk array 230' is exactly the same as that of physical disk array 230, so the architecture of physical disk array 230' is not described in detail here.

As two peer storage system nodes, an access request directed to a storage unit may be received and delivered to a corresponding storage unit through a mapper (not shown) of physical disk array 230. Similarly, an access request directed to a storage unit may be received and delivered to a corresponding storage unit through a mapper (not shown) of physical disk array 230'. For peer storage units, the storage units may be considered as ever accessed regardless of whether the access request is received from the mapper of physical disk array 230 or from the mapper of physical disk array 230'.

Based on storage system 200 shown in FIG. 2, an embodiment of a method for storage management according to this disclosure is described below in detail. The method for storage management may be executed by storage system 200 or its components shown in FIG. 2, or by other components of storage system 200 not shown in FIG. 2.

As described above, a temporary failure may occur in a disk in slice pool 210. Once the system detects that the failed disk changes from an unavailable state to an available state, i.e., recovers to a normal disk, the storage system determines storage units associated with the failed disk, so as to determine whether the storage units need to be rebuilt.

In some embodiments, in order to determine the storage units associated with the failed disk, the storage system may determine disk slices included in the failed disk and then determine the storage unit built based on at least a part of the disk slices. For example, storage units associated with the failed disk may be determined according to identifiers of the disk slices and identifiers of storage units allocated to the disk slices.

In FIG. 2, physical disk array 230 may monitor a change in the state of a disk. For example, if physical disk array 230 finds that disk $201_0$ is offline, physical disk array 230 may determine disk slices of the disk $201_0$ that have been allocated to build storage units. For example, it can be determined that disk slice $201_0$ in disk $201_0$ is configured to build storage unit $221_0$, disk slice $211_3$ is configured to build storage unit $221_1$, and disk slice $211_4$ is configured to build storage unit $221_2$.

Physical disk array 230 respectively marks corresponding storage positions in storage units $221_0$-$221_2$ associated with disk slices $211_0$, $211_3$, and $211_4$ as failed, that is, values of their Rebuild Logging Bitmaps are set to "1." This means that the positions are inaccessible.

If physical disk array 230 detects that disk $201_0$ changes from an unavailable state to an available state and storage units $221_0$-$221_2$ are determined as the storage units associated with failed disk $201_0$ (i.e., candidate storage units that may need to be rebuilt), physical disk array 230 may acquire historical access information about storage units $221_0$-$221_2$. The information may include information related to write requests of storage units $221_0$-$221_2$ when disk $201_0$ is in the unavailable state.

A specific access flag directed to each storage unit in storage units $221_0$-$221_2$ may be acquired from the historical access information. The access flag may, for example, indicate whether write requests directed to storage units $221_0$-$221_2$ exist when disk $201_0$ is in the unavailable state.

For example, the access flag may exist in the form of bits, which is also referred to as a Written Bit below. An access flag for a storage unit is initialized to "0" when the storage unit is created, and is set to "1" when the performance of the storage unit is degraded (e.g., due to a failure of one disk) and a write request is received during the degradation. The written bit is set to "0" if there is no write request.

Based on the historical access information, especially based on the access flags directed to storage units, a target storage unit to be rebuilt can be determined from the determined storage units that may need to be rebuilt.

If storage system 200 includes only one storage node, for example, physical disk array 230, and it is known by acquiring access flags directed to storage units $221_0$-$221_2$ from the historical access information that storage unit $221_0$ was accessed when disk $201_0$ was in the unavailable state, the access flags for the storage units can be expressed as:

TABLE 1

| Access flag for storage unit | |
|---|---|
| Storage unit | Access flag (written bit) |
| $221_0$ | 1 |
| $221_1$ | 0 |
| $221_2$ | 0 |

As shown in Table 1, the written bit of storage unit $221_0$ is set to "1," and the written bits of storage units $221_1$ and $221_2$ are set to "0." Therefore, in this embodiment, storage unit $221_0$ is determined as the target storage unit to be rebuilt.

If the storage system includes two peer storage nodes, for example, physical disk array 230 and physical disk array 230', the respective access to storage units $221_0$-$221_2$ on the two storage nodes needs to be considered, because, as shown above, a storage unit can be accessed through any storage node separately.

Therefore, historical access information about the two storage nodes needs to be acquired to determine which storage units were accessed when the disk was in an unavailable state. For example, physical disk array 230 may send a request to physical disk array 230' to synchronize historical access information about all storage units.

For example, it is known by acquiring access flags, that is, written bits, directed to storage units $221_0$-$221_2$ from the historical access information that storage unit $221_0$ in physical disk array 230 was accessed when disk $201_0$ was in the unavailable state and that storage unit $221_1$ in physical disk array 230' was accessed when disk $201_0$ was in the unavailable state, and then the access flags for the storage units may be expressed as:

TABLE 2

| Access flag for storage unit | |
|---|---|
| Storage unit | Access flag (written bit) |
| $221_0$ | 1 |
| $221_1$ | 1 |
| $221_2$ | 0 |

As shown in Table 1, the written bits of storage units $221_0$ and $221_1$ are set to "1," and the written bit of storage unit $221_2$ is set to "0." Therefore, in this embodiment, storage units $221_0$ and $221_1$ are determined as target storage units to be rebuilt.

After the target storage units to be rebuilt are determined, the rebuild logging bitmap of a storage unit that does not receive any write request, i.e., the storage unit other than the target storage units in the previously determined candidate storage units associated with the failed disk, will be cleared, and a rebuild bitmap will be set for the determined target storage units to be rebuilt.

For example, according to the example shown in Table 2, storage units $221_0$ and $221_1$ are determined as the target storage units, and then the rebuild logging bitmap of storage unit $221_2$ can be cleared. The determined target storage units to be rebuilt, for example, storage units $221_0$ and $221_1$, are marked as to-be-rebuilt.

In addition, for a storage unit other than the target storage units in the candidate storage units, for example, storage unit $221_2$, disabling of a write operation therefor when the disk $201_0$ is in the unavailable state can be removed.

Based on the marked storage units to be rebuilt, for example, storage units $221_0$ and $221_1$, physical disk array 230 and/or physical disk array 230' may send a "repair request" event to the mapper (not shown) to indicate the target storage units to be rebuilt. The mapper initiates rebuilding of the target storage units after receiving the "repair request" event.

Once the rebuilding is completed, disabling of a write operation when the disk is in the unavailable state can be removed for the target storage units. In addition, after completion of the rebuilding, an access flag indicating whether the storage unit is write-accessed during performance degradation is cleared.

In the presence of two peer storage nodes, in the process of determining which storage units need to be rebuilt from the storage units associated with the failed disk, there is a situation where one storage node has not yet acquired historical access information about another storage node when the another storage node is suddenly offline. In this case, the storage node cannot know which storage units associated with the failed disk were accessed through the another storage node. This situation is described below with reference to the storage system shown in FIG. 3. FIG. 3 is a schematic diagram of an example of a storage system according to an embodiment of this disclosure.

Figure 3:
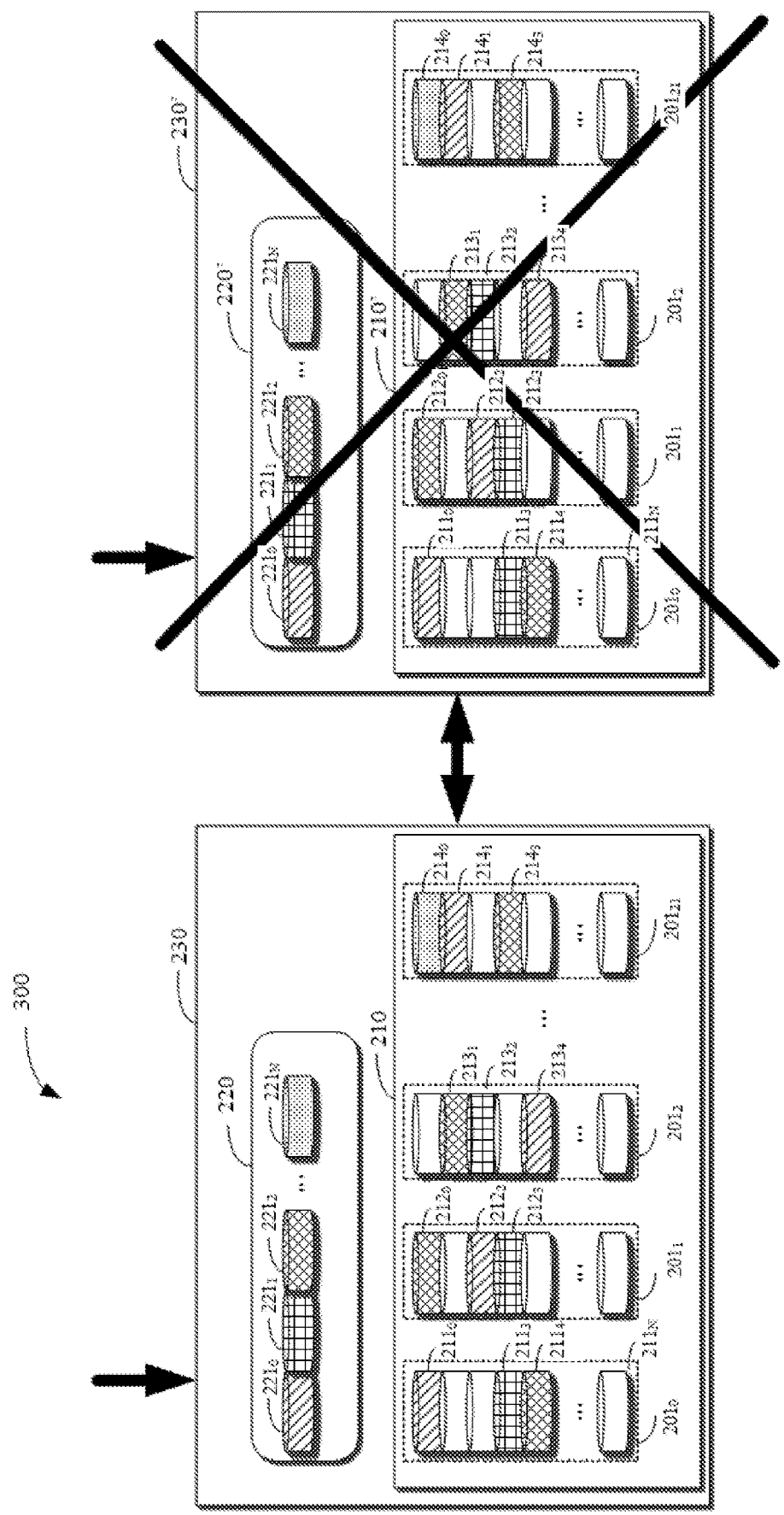
FIG. 3 is a schematic diagram of an example of a storage system according to an embodiment of this disclosure.

The architecture of storage system 300 shown in FIG. 3 is basically the same as that of storage system 200 shown in FIG. 2, and thus is not described in detail again here.

As shown in FIG. 3, for example, this situation can also be referred to as peer lost. At this point, physical disk array 230 does not know which storage units associated with failed disk $201_0$ were accessed through physical disk array 230'. In this case, it is assumed that the access flags for all the storage units associated with failed disk $201_0$, that is, storage units that suffer performance degradation due to the failure of disk $201_0$, should be updated to indicate that they are requested to be written when the disk is in the unavailable state. That is, their written bits are set to "1."

For example, if storage units $221_0$-$221_2$ are still determined as the storage units associated with the failed disk $201_0$, during performance degradation of storage units $221_0$-$221_2$, physical disk array 230 will also consider the access flags for storage units $221_0$-$221_2$ as requested to be written (from a storage node including physical disk array 230') when the disk is in the unavailable state even if physical disk array 230 can only determine that storage unit $221_0$ is requested to be written (from a storage node including physical disk array 230) when the disk is in the unavailable state.

Similarly, if physical disk array 230 is offline, physical disk array 230' may also perform the same processing.

It is also possible that if a storage node was ever restarted, when a primary node (for example, a storage node of physical disk array 230) is started, it is to be checked and determined whether a disk changes to an online state after the primary node is started. If yes, access flags for all storage units associated with the disk need to be updated to indicate that they are requested to be written when the disk is in the unavailable state. That is, their written bits are set to "1." Therefore, the access flags are non-permanent records, and thus physical disk array 230 cannot know whether a write request directed to one storage unit exists before startup.

Data loss can be avoided to a great extent by the method for storage management according to this disclosure described with reference to the above embodiments. A mechanism for avoiding data loss with the method according to this disclosure is described below in further detail with reference to FIG. 4. FIG. 4 is a schematic diagram of an example of a storage system according to an embodiment of this disclosure. To simplify the description, only one disk slice pool 210 is shown in the storage system of FIG. 4.

Figure 4:
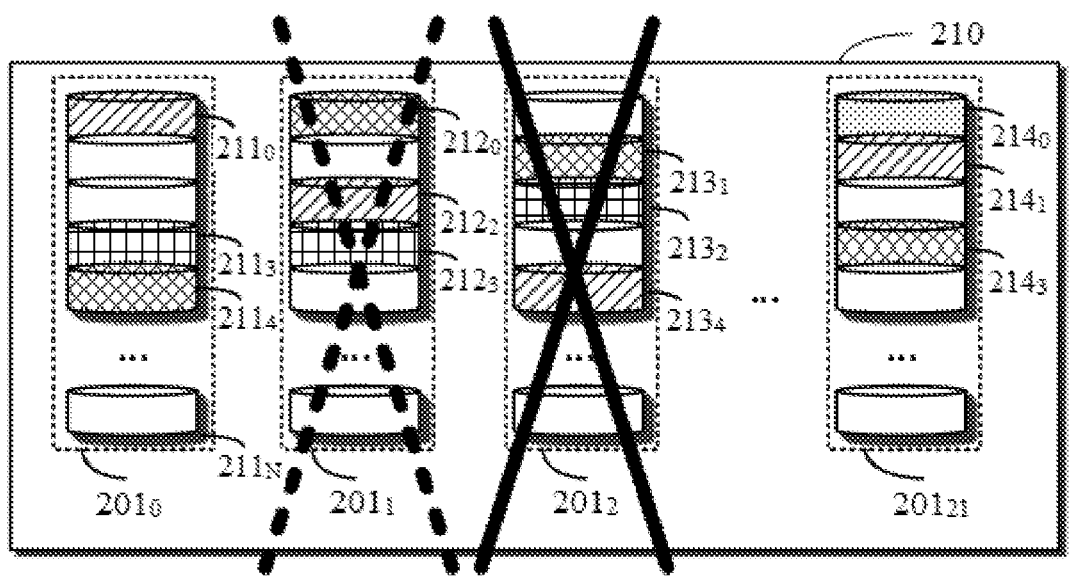
FIG. 4 is a schematic diagram of an example of a storage system according to an embodiment of this disclosure.

As shown in FIG. 4, disk slice pool 210 may include disks $201_0$-$201_{21}$. If disk $201_1$ is offline (temporarily failed) and a permanent failure occurs in disk $201_2$, the failures in disk $201_1$ and disk $201_2$ affect the performance of storage units $221_0$-$221_2$ at the same time. In the conventional solution, even if no write request for storage units $221_0$-$221_2$ exists before a permanent failure occurs in disk $201_2$, the storage system does not know that no write request for storage units $221_0$-$221_2$ exists after disk $201_1$ is online again. Therefore, the storage system does not know whether the storage units need to be rebuilt. As such, since disk $201_2$ also failed, data loss may be caused by the storage units. With the method that has been described above, by searching for a historical access record of the storage units, it can be determined according to the access flags whether write requests for storage units $221_0$-$221_2$ exist when disk $201_1$ is offline (temporarily failed). If no, data on the storage space associated with disk $201_1$ in the storage units may be considered as valid. Therefore, data on the storage space associated with disk $201_2$ can be recovered through other data on the storage units, because the failure of disk $201_2$ is permanent.

Even if the data on the storage space associated with disk $201_2$ cannot be recovered temporarily or has not been completely recovered yet, if it can be determined whether a write request for storage units $221_0$-$221_2$ exists when disk $201_1$ is offline (temporarily failed), the data on the storage space associated with disk $201_1$ in the storage units may be considered as valid, that is, the data does not need to be recovered. As such, storage units $221_0$-$221_2$ may suffer performance degradation at most but will not be considered as completely crashed.

As such, a low-cost method is provided to improve rebuilding efficiency and reliability. With the introduced access flags, unnecessary scanning for most of storage units in the user data layer can be avoided when the storage units do not receive any write request during the degradation. It can improve the rebuilding efficiency. In addition, the system reliability is improved by avoiding the situation that the storage units are damaged as one disk fails that is followed by permanent damage of another disk. At the same time, it is low-cost to keep the access flags. There is no need to keep the bit or synchronize it with the peer. Therefore, it does not affect the response time of the input/output (I/O).

Figure 5:
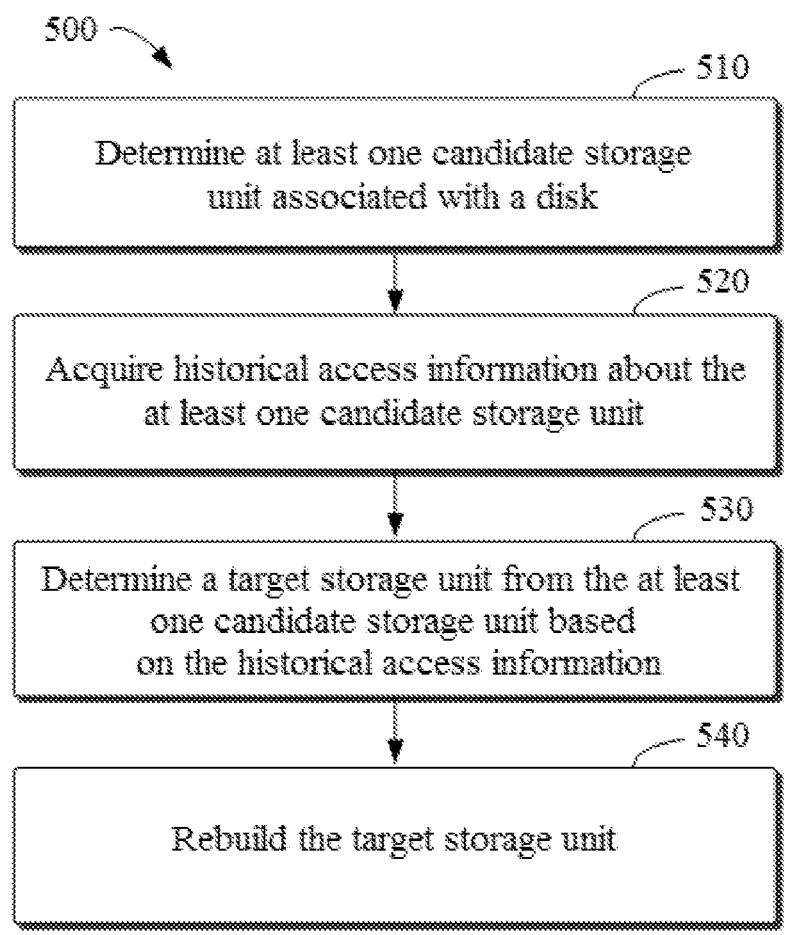
FIG. 5 is a flowchart of a method for storage management according to an embodiment of this disclosure.

FIG. 5 is a flowchart of method 500 for storage management according to some embodiments of this disclosure. Method 500 can be implemented at any of mapper 102, physical disk array 104, slice pool 110, and layer 112 shown in FIG. 1. Method 500 can be executed, for example, by any component of operating environment 100 shown in FIG. 1, or by another computing device in operating environment 100 in FIG. 1.

In 510, if it is detected that a disk changes from an unavailable state to an available state, at least one candidate storage unit associated with the disk is determined.

In an embodiment, disk slices included in the disk can be determined, and a storage unit built based on at least a part of the disk slices can be determined as a candidate storage unit.

In 520, historical access information about the at least one candidate storage unit is acquired, the historical information including information related to a write request directed to the at least one candidate storage unit when the disk is in the unavailable state. In 530, a target storage unit is determined from the at least one candidate storage unit based on the historical access information.

In an embodiment, an access flag directed to the at least one candidate storage unit can be determined from the historical access information, the access flag indicating whether a write request directed to the at least one candidate storage unit exists when the disk is in the unavailable state, and the target storage unit can be determined from the at least one candidate storage unit based on the access flag, a write request directed to the target storage unit existing when the disk is in the unavailable state.

In an embodiment, the at least one candidate storage unit includes a plurality of candidate storage units, and disabling of a write operation when the disk is in the unavailable state can be removed for candidate units other than the target candidate unit in the plurality of candidate storage units.

In an embodiment, from a write request received when the disk is in the unavailable state, an identifier of the storage unit to which the write request is directed can be acquired; and the access flag directed to the at least one candidate storage unit can be updated according to a determination that the identifier corresponds to the at least one candidate storage unit, for indicating that a write request directed to the at least one candidate storage unit exists when the disk is in the unavailable state.

In 540, the target storage unit is rebuilt.

In an embodiment, in response to completion of the rebuilding, disabling of a write operation when the disk is in the unavailable state can be removed for the target storage unit.

In an embodiment, in response to completion of the rebuilding, an access flag directed to the target storage unit is cleared, the access flag indicating that a write request directed to the target storage unit exists when the disk is in the unavailable state.

Figure 6:
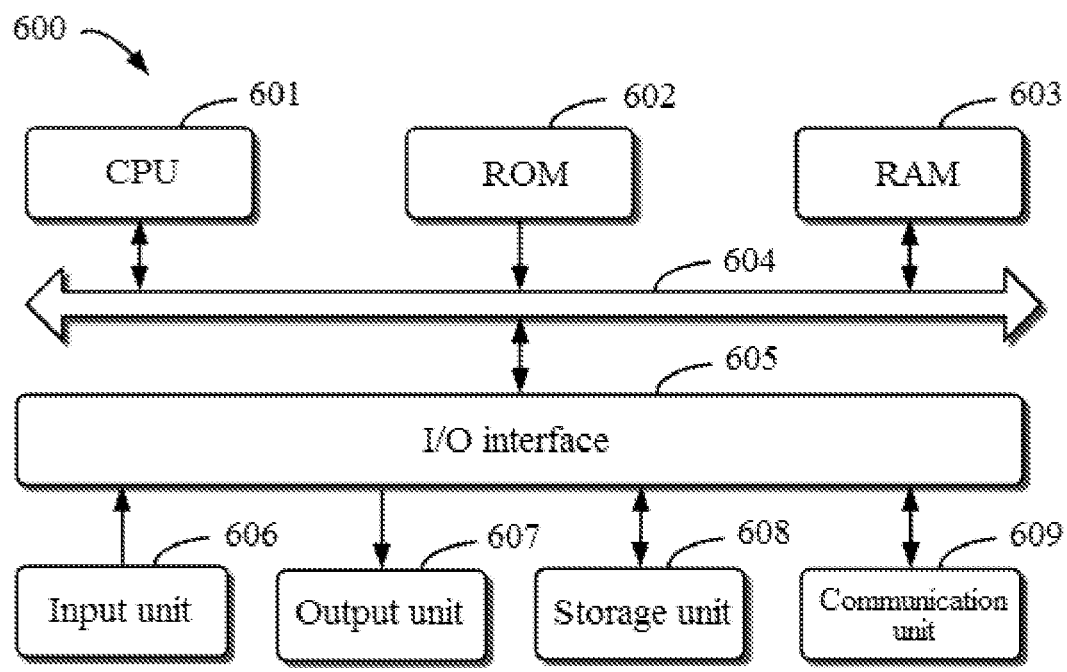
FIG. 6 is a block diagram of an example device that can be used to implement an embodiment of this disclosure.

FIG. 6 is a schematic block diagram of example device 600 that can be used to implement an embodiment of this disclosure. For example, any of mapper 102, physical disk array 104, slice pool 110, and layer 112 shown in FIG. 1 can be implemented by device 600. As shown in the figure, device 600 includes central processing unit (CPU) 601 that can perform various appropriate actions and processing according to computer program instructions stored in read-only memory (ROM) 602 or computer program instructions loaded from storage unit 608 to random access memory (RAM) 603. In RAM 603, various programs and data required for the operation of device 600 can also be stored. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a physical keyboard and a mouse; output unit 607, such as various types of displays and speakers; storage unit 608, such as a physical magnetic disk and a physical optical disc; and communication unit 609, such as a network card, a modem, and a wireless communication transceiver. Communication unit 609 allows device 600 to exchange information/data with other devices over a computer network such as the Internet and/or various telecommunication networks.

The various processes and processing described above, for example, method 500, may be performed by processing unit 601. For example, in some embodiments, method 500 can be implemented as a computer software program that is tangibly included in a machine-readable medium, for example, storage unit 608. In some embodiments, some or all of the computer program can be loaded and/or installed onto device 600 via ROM 602 and/or communication unit 609. When the computer program is loaded into RAM 603 and executed by CPU 601, one or more actions of method 500 described above may be implemented.

This disclosure may be a method, an apparatus, a system, and/or a computer program product. The computer program product may include a computer-readable storage medium having computer-readable program instructions for performing various aspects of this disclosure loaded thereon.

The computer-readable storage medium can be a tangible device capable of retaining and storing instructions used by an instruction-executing device. The computer-readable storage medium can be, for example, but is not limited to, an electrical storage unit, a magnetic storage unit, an optical storage unit, an electromagnetic storage unit, a semiconductor storage unit, or any appropriate combination of the above. More specific examples (a non-exhaustive list) of the computer-readable storage medium include: a portable physical computer disk, a physical hard disk, a random access memory (RAM), a read-only memory (ROM), an erasable programmable read-only memory (EPROM or flash memory), a static random access memory (SRAM), a portable physical compact disk read-only memory (CD-ROM), a physical digital versatile disk (DVD), a memory stick, a physical floppy disk, a mechanical coding device such as a punch card or a protruding structure within a groove on which instructions are stored, and any appropriate combination of the above. The computer-readable storage medium as used herein is not explained as transient signals per se, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage units over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of this disclosure may be assembly instructions, instruction set architecture (ISA) instructions, machine instructions, machine-related instructions, microcode, firmware instructions, state setting data, or source code or object code written in any combination of one or more programming languages, including object-oriented programming languages such as Smalltalk and C++ as well as conventional procedural programming languages such as the "C" language or similar programming languages. The computer-readable program instructions may be executed completely on a user's computer, executed partially on a user's computer, executed as a separate software package, executed partially on a user's computer and partially on a remote computer, or executed completely on a remote computer or a server. In the case where a remote computer is involved, the remote computer can be connected to a user's computer over any kind of networks, including a local area network (LAN) or wide area network (WAN), or can be connected to an external computer (e.g., connected over the Internet using an Internet service provider). In some embodiments, an electronic circuit, such as a programmable logic circuit, a field programmable gate array (FPGA), or a programmable logic array (PLA), can be customized by utilizing state information of the computer-readable program instructions. The electronic circuit can execute computer-readable program instructions to implement various aspects of this disclosure.

Various aspects of this disclosure are described here with reference to flowcharts and/or block diagrams of the method, the apparatus (system), and the computer program product implemented according to the embodiments of this disclosure. It should be understood that each block in the flowcharts and/or block diagrams and a combination of the blocks in the flowcharts and/or block diagrams can be implemented by computer-readable program instructions.

The computer-readable program instructions can be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium, and the instructions cause a computer, a programmable data processing apparatus and/or other devices to work in a specific manner, such that the computer-readable medium storing the instructions includes an article of manufacture that includes instructions for implementing various aspects of the functions/actions specified in one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer-implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate the architecture, functions, and operations of possible implementations of the system, method, and computer program product according to multiple embodiments of this disclosure. In this regard, each block in the flowcharts or block diagrams can represent a module, a program segment, or a portion of instructions that includes one or more executable instructions for implementing specified logical functions. In some alternative implementations, functions labeled in the blocks may occur in an order different from that labeled in the accompanying drawing. For example, two successive blocks may actually be performed basically in parallel, or they can be performed in an opposite order sometimes, depending on the functions involved. It also should be noted that each block in the block diagrams and/or flowcharts and a combination of the blocks in the block diagrams and/or flowcharts can be implemented using a dedicated hardware-based system for executing specified functions or actions, or can be implemented using a combination of dedicated hardware and computer instructions.

Various embodiments of this disclosure have been described above, and the foregoing description is illustrative rather than exhaustive, and is not limited to the disclosed various embodiments. Numerous modifications and changes are apparent to those of ordinary skill in the art without departing from the scope and spirit of the illustrated various embodiments. The selection of terms as used herein is intended to best explain the principles and practical applications of the various embodiments, or the technical improvements to technologies on the market, or to enable other persons of ordinary skill in the art to understand the various embodiments disclosed here.

The invention claimed is:

1. A method for storage management, comprising:
   determining, in response to a detection that a disk changes from an unavailable state to an available state, a plurality of candidate RAID stripes associated with the disk, wherein each one of the candidate RAID stripes is built using a plurality of disk slices, wherein each one of the candidate RAID stripes is built at least in part using a respective unique one of a plurality of disk slices located on the disk, and wherein determining the plurality of candidate RAID stripes associated with the disk comprises identifying all RAID stripes built using any one of the plurality of disk slices located on the disk as the plurality of candidate RAID stripes;
   requesting, by a first storage node from a second storage node, historical access information about the candidate RAID stripes, wherein the first storage node and the second storage node are peer storage nodes, wherein the candidate RAID stripes are accessible through both the first storage node and the second storage node, the historical information comprising information related to a write request directed to the candidate RAID stripes when the disk is in the unavailable state;
   prior to receiving the historical access information about the candidate RAID stripes from the second storage node, in response to detecting that the second storage node is offline, setting, by the first storage node, access flags corresponding to all of the candidate RAID stripes, wherein the access flags corresponding to the candidate RAID stripes indicate whether the corresponding candidate RAID stripes were written while the disk was in the unavailable state, and wherein the set access flags corresponding to all of the candidate RAID stripes indicate that all of the candidate RAID stripes were written while the disk was in the unavailable state;
   determining a target RAID stripe from the candidate RAID stripes based on the historical access information, wherein determining the target RAID stripe from the candidate RAID stripes is performed based at least in part on the access flags corresponding to all of the candidate RAID stripes; and
   rebuilding the target RAID stripe.

2. The method of claim 1, the method further comprising:
   removing, for candidate RAID stripes other than the target RAID stripe in the plurality of candidate RAID stripes, disabling of a write operation when the disk is in the unavailable state.

3. The method of claim 1, further comprising: acquiring, from the write request received when the disk is in the unavailable state, an identifier of a RAID stripe to which the write request is directed; and updating, according to a determination that the identifier corresponds to one of the candidate RAID stripes, an access flag corresponding to that one of the candidate RAID stripes, for indicating that the write request directed to that one of the candidate RAID stripes exists when the disk is in the unavailable state.

4. The method of claim 1, further comprising:
   removing, for the target RAID stripe and in response to completion of the rebuilding, disabling of a write operation when the disk is in the unavailable state.

5. The method of claim 1, further comprising:
   clearing, in response to completion of the rebuilding, an access flag directed to the target RAID stripe, the access flag indicating that a write request directed to the target RAID stripe exists when the disk is in the unavailable state.

6. An electronic device, comprising:
   a processor; and
   a memory coupled to the processor and storing instructions to be executed, wherein when executed by the processor, the instructions cause the electronic device to perform actions comprising:
   determining, in response to a detection that a disk changes from an unavailable state to an available state, a plurality of candidate RAID stripes associated with the disk, wherein each one of the candidate RAID stripes is built using a plurality of disk slices, wherein each one of the candidate RAID stripes is built at least in part using a respective unique one of a plurality of disk slices located on the disk, and wherein determining the plurality of candidate RAID stripes associated with the disk comprises identifying all RAID stripes built using any one of the plurality of disk slices located on the disk as the plurality of candidate RAID stripes;
   requesting, by a first storage node from a second storage node, historical access information about the candidate RAID stripes, wherein the first storage node and the second storage node are peer storage nodes, wherein the candidate RAID stripes are accessible through both the first storage node and the second storage node, the historical information comprising information related to a write request directed to the candidate RAID stripes when the disk is in the unavailable state;
   prior to receiving the historical access information about the candidate RAID stripes from the second storage node, in response to detecting that the second storage node is offline, setting, by the first storage node, access flags corresponding to all of the candidate RAID stripes, wherein the access flags corresponding to the candidate RAID stripes indicate whether the corresponding candidate RAID stripes were written while the disk was in the unavailable state, and wherein the set access flags corresponding to all of the candidate RAID stripes indicate that all of the candidate RAID stripes were written while the disk was in the unavailable state;
   determining a target RAID stripe from the candidate RAID stripes based on the historical access information; and
   rebuilding the target storage unit.

7. The device of claim 6, the actions further comprising:
   removing, for candidate RAID stripes other than the target RAID stripe in the plurality of candidate RAID stripes, disabling of a write operation when the disk is in the unavailable state.

8. The device of claim 6, wherein the actions further comprise: acquiring, from the write request received when the disk is in the unavailable state, an identifier of a RAID stripe to which the write request is directed; and updating, according to a determination that the identifier corresponds to one of the candidate RAID stripes, an access flag corresponding to that one of the candidate RAID stripes, for indicating that the write request directed to that one of the candidate RAID stripes exists when the disk is in the unavailable state.

9. The device of claim 6, wherein the actions further comprise:
   clearing, in response to completion of the rebuilding, an access flag directed to the target RAID stripe, the access flag indicating that a write request directed to the target RAID stripe exists when the disk is in the unavailable state.

10. A computer program product having a non-transitory computer readable medium which stores a set of instructions to perform storage management; the set of instructions, when carried out by computerized circuitry, causing the computerized circuitry to perform a method of:

determining, in response to a detection that a disk changes from an unavailable state to an available state, a plurality of candidate RAID stripes associated with the disk, wherein each one of the candidate RAID stripes is built using a plurality of disk slices, wherein each one of the candidate RAID stripes is built at least in part using a respective unique one of a plurality of disk slices located on the disk, and wherein determining the plurality of candidate RAID stripes associated with the disk comprises identifying all RAID stripes built using any one of the plurality of disk slices located on the disk as the plurality of candidate RAID stripes;

requesting, by a first storage node from a second storage node, historical access information about the candidate RAID stripes, wherein the first storage node and the second storage node are peer storage nodes, wherein the candidate RAID stripes are accessible through both the first storage node and the second storage node, the historical information comprising information related to a write request directed to the candidate RAID stripes when the disk is in the unavailable state;

prior to receiving the historical access information about the candidate RAID stripes from the second storage node, in response to detecting that the second storage node is offline, setting, by the first storage node, access flags corresponding to all of the candidate RAID stripes, wherein the access flags corresponding to the candidate RAID stripes indicate whether the corresponding candidate RAID stripes were written while the disk was in the unavailable state, and wherein the set access flags corresponding to all of the candidate RAID stripes indicate that all of the candidate RAID stripes were written while the disk was in the unavailable state;

determining a target RAID stripe from the candidate RAID stripes based on the historical access information; and rebuilding the target RAID stripe.

\* \* \* \* \*